United States Patent [19]

Staude

[11] 3,957,935
[45] May 18, 1976

[54] PROCESS FOR THE PRODUCTION OF A DRY DESALTING CELLULOSE ACETATE MEMBRANE

[75] Inventor: Eberhard Staude, Schlangenbad-Wambach, Germany

[73] Assignee: Hoechst Aktiengesellschaft, Germany

[22] Filed: Dec. 5, 1974

[21] Appl. No.: 529,839

[30] Foreign Application Priority Data
Dec. 10, 1973 Germany............................ 2361369

[52] U.S. Cl............................. 264/41; 210/500 M; 264/217
[51] Int. Cl.²...................... B29D 7/02; B29D 27/04
[58] Field of Search...................... 264/41, 49, 217; 210/500 M

[56] References Cited
UNITED STATES PATENTS
3,567,809   3/1971   Ueno et al. ........................... 264/41
3,592,672   7/1971   Rowley et al. ..................... 264/41 X
3,772,072   11/1973  Brown et al. ..................... 264/49 X
3,780,147   12/1973  Stana ................................... 264/49

OTHER PUBLICATIONS

Vos, Kenneth D. and F. O. Burris, "Drying Cellulose Acetate Reverse Osmosis Membranes" in *I & EC Product Research and Development*, Vol. 8, No. 1, Mar. 1969, pp. 84–89.

*Primary Examiner*—Philip Anderson
*Attorney, Agent, or Firm*—James E. Bryan

[57] ABSTRACT

This invention relates to an improvement in the process for the production of a dry cellulose acetate membrane comprising forming a sheet material from a cellulose acetate solution, treating the sheet material with a liquid and drying, the improvement comprising treating the sheet material with an aqueous solution of a polyvalent aliphatic alcohol having 2 to 4 carbon atoms for about 2 to 10 minutes at a temperature in the range of about 50° to 110°C, and drying said sheet material at a temperature not in excess of about 50°C.

2 Claims, No Drawings

3,957,935

PROCESS FOR THE PRODUCTION OF A DRY DESALTING CELLULOSE ACETATE MEMBRANE

Cellulose acetate membranes have been employed successfully for reverse osmosis as well as for ultrafiltration.

The efficiency of such membranes, however, depends upon a certain relatively high water content thereof. This water content must be constantly maintained in the production of the membrane if the properties characterizing the membranes for the required use — high volume flux and high desalting capacity — are not lost completely or substantially completely.

The necessity to keep the membranes, prior to and after their use, in water at least, in a sufficiently moist atmosphere is a disadvantage since shipping of the membranes, as well as their storage prior to and after their use, and the equipping of the modules with the membranes are complicated.

There is the further risk that storage of the membranes in water or a moist atmosphere will effect destruction of the membrane structure, which may lead to a reduction or loss of their efficiency.

Various attempts therefore have been made to produce so-called "dry" membranes of cellulose acetate which can be stored and shipped in the dry state and can be inserted in modules in the dry state without sustaining a loss in efficiency.

It is known to treat cellulose acetate sheet materials first with water at a temperature in the range of 70° to 90°C, whereby a desalting ability is imparted to the sheet material by the structural change caused by the heat treatment. After this treatment, the desalting membrane is contacted with glycerol or a polyglycol containing a surfaceactive agent and is then dried at room temperature or an elevated temperature. Apart from the fact that the known process requires three process steps, it furthermore has the disadvantage that the desalting cellulose acetate membrane produced according to the process contains a portion of surface-active agent which is removed therefrom only after a relatively long period of use of the membrane so that, prior to that time, the liquid obtained by means of the membrane may contain the mentioned substances and thus be undesirably contaminated.

It also has been suggested to first treat a cellulose acetate membrane with hot water and then dehydrate the membrane, by the action of an alcohol with 1 to 4 carbon atoms, from a water content of initially 60 to 70 per cent by weight to a water content below 20 per cent by weight. This dehydrating procedure is followed by the treatment of the membrane with a non-polar solvent, e.g. hexane, cyclohexane, benzene, toluene or xylene, in order to remove the polar alcohol from the membrane. Then, the membrane is dried at an elevated temperature.

According to another known process for the production of socalled dry cellulose acetate membranes, a cellulose acetate membrane is first treated with hot water, the treated membrane is then immersed in an aqueous solution of a polyvalent alcohol and a carboxylic acid with 1 to 3 carbon atoms, and then dried at room temperature or an elevated temperature.

The mentioned known processes have in common that they proceed in three steps. In the first process step, a cellulose acetate membrane is treated with hot water in order to convert it into a desalting membrane. In a second process step, which proceeds at room temperature, the membrane is subjected to the action of an aqueous solution of organic media which prepares for drying of the membrane by a sufficiently intensive exchange of the water for the organic components. Then the substantially dehydrated membrane is dried at room temperature or an elevated temperature; the latter, however, may impair the efficiency of the membrane.

The object of the invention is to provide a process for the production of a dry cellulose acetate membrane which eliminates the disadvantages of the known processes and by means of which it is possible, in a simple manner by means of two process steps, to obtain cellulose acetate membranes which have the desired properties necessary for ultrafiltration and reverse osmosis.

This is achieved by a process for the production of a dry cellulose acetate membrane, in which first a sheet material is formed from a cellulose acetate solution, the sheet material is treated with a liquid and then dried. After the production of the sheet material of cellulose acetate, an aqueous solution of a polyvalent aliphatic alcohol with 2 to 4 carbon atoms is caused to act thereon for 2 to 10 minutes, the aqueous alcoholic solution having a temperature in the range of 50° to 110°C, and the sheet material is then dried at a temperature not in excess of 50°C.

In the production of the dry desalting cellulose acetate membrane according to the process of the invention, first a film is cast in known manner from a cellulose acetate solution. The casting solution is composed of cellulose acetate dissolved in acetone and contains a portion of dimethyl formamide. Such casting solutions are known and are no part of the present invention. The casting solution is cast onto a support, for example by extruding it through a die and forming a liquid layer on the support, e.g. an endless web. After the formation of the liquid layer of cellulose acetate solution on the solid support, a part of the acetone is removed from the solution, which results in coagulation of the dissolved cellulose acetate and the formation of the asymmetrical membrane layer. The removal of a sufficient quantity of acetone from the casting solution may be performed, for example, by exposing the liquid layer for volatilization to the ambient temperature (room temperature) during a sufficiently long period of time. Film formation takes place by immersion in water due to precipitation. Then, the sheet material of cellulose acetate, which has no desalting ability, is contacted with an aqueous solution of an aliphatic alcohol having at least two OH groups and 2 to 4 carbon atoms. For example, the sheet material is placed into a container containing the solution or is continuously passed through a container thereof. The content of the above-mentioned polyvalent aliphatic alcohol in the solution is in the range of 20 to 35 per cent by weight, preferably 30 per cent by weight, calculated on the total weight of the solution.

Suitable alcohols are, for example, ethylene glycol, propylene glycol, particularly preferable, however, is glycerol. It is also possible to use an aqueous solution containing a mixture of such alcohols.

The time of action of the aqueous alcoholic solution upon the membrane is in the range of 2 to 10 minutes, particularly preferably, however, is the range of 4 to 8 minutes.

The aqueous alcoholic solution has a temperature in the range of 50° to 110°C, particularly preferably a temperature in the range of 60° to 90°C.

After the treatment with the liquid, the membrane is dried at room temperature or a temperature not in excess of 50°C. If drying is performed at an elevated temperature, this may be performed, for example, by passing the membrane in the form of a web through a drying channel heated to the desired temperature, e.g. a temperature of 40°C.

A "dry" membrane is one in which the production-dry membrane has a desalting effect after wetting with water.

The invention wll be further illustrated by reference to the following examples:

EXAMPLE 1

In this example, desalting cellulose acetate membranes obtained by heating in a water bath are compared to desalting cellulose acetate membranes obtained by heating in an aqueous glycerol solution and subsequent drying.

All cellulose acetate membranes used are from a casting solution prepared in the above-described manner. One of these freshly prepared cellulose acetate membranes is heated for 5 minutes in a water bath at a temperature of 84°C. This membrane must be stored in the wet state before it is tested in a conventional apparatus with a 0.5 per cent NaCl solution at a pressure of 40 bars. The retention capacity is 96.3 per cent at a volume flux of 580 l/m²d.

Treatment of the comparison membranes can be seen from the table below. In this case, the membranes are heated for 5 minutes at different heating temperatures in a 30 per cent glycerol solution. The membranes are then dried and stored in the dry condition before, as in the case of the wet membranes, they are introduced into a conventional test apparatus and tested with the same 0.5 per cent NaCl solution at 40 bars.

The membranes wetted again yielded the following values:

| Temperature (°C) | Flux (l/m²d) | Salt retaining capacity (%) |
|---|---|---|
| 80 | 2,500 | 30 |
| 84 | 1,600 | 64 |
| 86 | 1,000 | 75 |
| 88 | 8,400 | 90.2 |
| 90 | 560 | 96.2 |

The results show that, for achieving equal values, a dry membrane must be subjected to a temperature about 5°C higher than is usually employed in order to obtain a wet desalting membrane.

EXAMPLE 2

This example shows the influence of the glycerol content on the desalting effect and on the volume flux. For this purpose, cellulose acetate membranes prepared according to a known process are heated for 5 minutes at a temperature of 90°C in solutions of different glycerol concentrations.

The salt-retention capacity and the volume flux are again determined at pressures of 40 bars with the use of a 0.5 per cent NaCl solution.

The following table shows the different glycerol concentrations as well as the volume flux and the salt retention capacity.

| Glycerol (%) | Flux (l/m²d) | Salt retention capacity (%) |
|---|---|---|
| 20 | 410 | 97.3 |
| 25 | 500 | 96.5 |
| 30 | 560 | 96.2 |
| 35 | 770 | 90.9 |

All membranes are dry membranes before being used.

It will be obvious to those skilled in the art that many modifications may be made within the scope of the present invention without departing from the spirit thereof, and the invention includes all such modifications.

What is claimed is:

1. In the process for the production of a dry cellulose acetate membrane comprising forming a sheet material from a cellulose acetate solution, treating the sheet material with a liquid and drying, the improvement consisting essentially of treating the sheet material with an aqueous solution of a polyvalent aliphatic alcohol having 2 to 4 carbon atoms for about 2 to 10 minutes at a temperature in the range of about 50° to 110°C, and drying said sheet material at a temperature not in excess of about 50°C.

2. A process according to claim 1 in which the polyvalent aliphatic alcohol is glycerol.

* * * * *